Sept. 22, 1959     H. U. WIDMER     2,904,879
PROCESS FOR MAKING INTERPENETRATING MACHINE
PARTS ADAPTED FOR RELATIVE DISPLACEMENT
Filed Jan. 31, 1955

INVENTOR:
HANS ULRICH WIDMER
By
Richards & Geier
ATTORNEYS

United States Patent Office

2,904,879
Patented Sept. 22, 1959

2,904,879

PROCESS FOR MAKING INTERPENETRATING MACHINE PARTS ADAPTED FOR RELATIVE DISPLACEMENT

Hans Ulrich Widmer, Zurich, Switzerland, assignor to Société Financiere d'Expansion Commerciale et Industrielle S.A. "Sfindex," Sarnen, Switzerland Application January 31, 1955, Serial No. 485,238

Claims priority, application Switzerland March 18, 1954

1 Claim. (Cl. 29—423)

It is a frequent problem to manufacture accurately fitting interpenetrating machine parts, which are adapted for relative displacement. Particularly when the cross-sectional shapes of the individual parts are not defined by circles or straight lines but by rather complicated curves, the making of accurately fitting apertures is a time-wasting procedure. Assemblies of the mentioned kind are for instance the turbine distributors as described in the Swiss Patent No. 287,979. In such cases heretofore patterns have been used, in order to determine the relative position of the parts already at the moment when the parts are machined, but still the final working step was frequently carried out by hand. Owing for example to the novel products of the plastic industry, which are now available, it has been possible to develop a new process which permits an important simplification and which constitutes the subject of the present invention. In this method a first finished part is used as a former for the accurate making or locating respectively of the apertures in a second part. Thus these apertures do not only have an accurately fitting shape but are also properly located.

The description of the method shall be preceded by two definitions: the penetrating (male) workpieces are designated in the following as workpiece 1, whereas the penetrated (female) workpieces are designated as workpiece 2.

For a given machine, the workpieces 1 are provided in a required number, and machined after a known method in order to be shaped according to their later use. The workpieces 2 are also provided in a required number for a given machine and apertured at the points of penetration, those apertures having greater dimensions than the workpieces 1. It is sufficient for this purpose to provide openings having a comparatively crude shape, as they are for instance obtained by a casting operation. The aperture can have any desired shape, but preferably the wall is profiled in direction of the axis of penetration. The assemblage is then carried out so far, that the workpieces 1 and 2 take up their final right position relative to each other. Since the apertures have too large dimensions, a space will be defined between the workpieces 1 and 2. Into said space a material is then placed, which will determine the final dimensions of the aperture. In order to allow for a certain play between the workpiece 1 and the material, which is cast into the space, the piece 1 is coated first with a film consisting of a viscous or solid material which is again removed after the end of the procedure. The thickness of this film determines further the magnitude of the play between the workpieces ensuring the free relative displacement of said pieces. The film consisting of a viscous or solid material with which the workpiece 1 is coated, can be either supplemented or substituted by members, which are close fits on the workpiece 1. These fitting members are pushed over the workpieces 1 and then firmly bonded by a filled material to the workpiece 2 in right position thereto. Such fitting members may further be simultaneously used as a closure on one or both sides of the space between the workpieces 1 and 2, whereupon the intermediate space is filled out. The coating of the piece 1 with a film consisting of a viscous or solid material can further be substituted by surrounding said piece with a circumferentially closed flexible tube-like casing. The latter is also set in its final right position and subsequently filled with a plastic or elastic material, which may also solidify after the filling operation. The intermediate body thus obtained is a close fit in the workpiece 2 and fully surrounds the workpiece 1. In this manner the exact shape is formed automatically, and must not be made by a complicated machining operation.

For carrying out the method of the invention, any suitable filling material can be used, which is adapted to be filled into the cross-section of the space either in solid, plastic or liquid state and to solidify subsequently. It is understood that the kind of the used material for example plastic or metal will be chosen in each case according to the special requirements. It is obviously a great advantage of the described method, that it is no longer needed to machine elaborately the individual apertures of the workpiece 1. Since the apertures have substantially larged dimensions they can be made with or without profile in the casting step already. If on the other hand fitting members are used, the latter can be finished at the same time in a single working step before they are fitted in. When the said members are machined, the size and the shape of the workpieces 1 are the sole critical factors. Those pieces 1 can also be machined in a similar manner and possibly at the same time as said members. Thus machine work (e.g. profiling) can here be used to a large extent, while the packing with a filled flexible tube makes the precise machining of the pieces 2 likewise unnecessary, said tube adapting itself readily to the existing profiles.

The method of the invention is now described in greater detail with reference to the accompanying drawings.

*Example 1*

Figure 1:
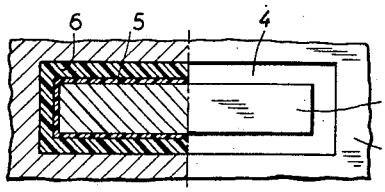
Fig. 1 is a plan section of a rectangular prismatic body, which penetrates a flat plate.
Figure 2:
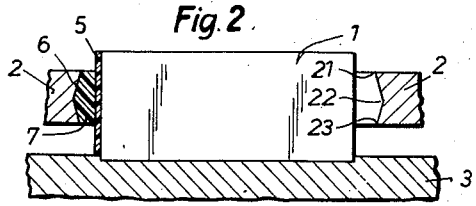
Fig. 2 shows a vertical section of the embodiment of Fig. 1.
Figure 3:
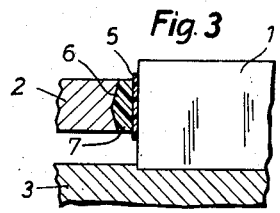
Fig. 3 shows a modification thereof.

The workpieces 1, as shown in the Figures 1 and 2 are provided in a required number and all mounted on a workpiece 3. The workpieces 2 surround the workpieces 1, and have apertures 4 at the points of penetration. The said apertures have a somewhat larger plan cross sectional area than the corresponding work pieces 1; in vertical section according to Fig. 2 they have the profile 21—22—23. The assemblage is carried out so far, that the workpieces 1 and 2 take up their final right position relative to each other. The work piece 1 is subsequently covered with a film 5 consisting of a viscous or solid material. The film may cover the work-piece 1 entirely (Fig. 2) or only partially (Fig. 3). A material 7 is then introduced into the space 6 between the film 5 and the workpiece 2 to fill this space, whereupon it is solidified. The film 5 consisting of a viscous or solid material which is applied around the work-piece 1, prevents the adhesion of the filled material to said piece 1 and thus ensures free relative displacement. If a play is desired in the finished penetration, the covering film 5 is removed again after the solidification of the filling material 7. It is thus possible to predetermine the play by a chosen thickness of the covering film 5.

Example 2

Figure 4:
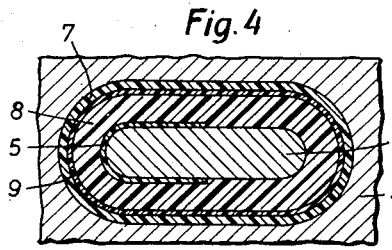
Figs. 4 and 5 show a plan and vertical section respectively of a second embodiment of the invention, where a fitted in packing is provided.
Figures 5, 7:
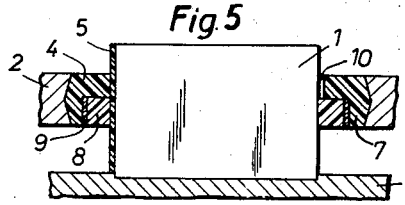
Fig. 7 is a vertical section of the embodiment shown in Fig. 6.

The work-pieces 1, as shown in the Figures 4 and 5 are mounted in a required number on a workpiece 3. The work-pieces 2 have openings like in the Example 1. The assemblage is carried out so far, that the work-pieces 1 and 2 are located in their final right position relative to each other. The work-piece 1 is subsequently coated with a suitable coating 5, which will prevent the adhesion of the work-piece 1 to the filling material 7. On the level of the opening 4 a tape 8 made of an elastic packing material is placed and strongly pressed against the casing by a band 9. The remaining space is filled with a material 7. When the latter has assumed its final shape, the coating or casing 5 can be removed from the work-piece 1. The elastic packing material 7 will then be caused to project into the small groove 10 formed by removal of the coating 5 and thereby tightly seal the upper side of the work-piece from its lower side. Thus it is ensured, that the packing exerts a uniform pressure and that the pieces 1 and 2 can be readily displaced relative to each other.

Example 3

Figure 6:
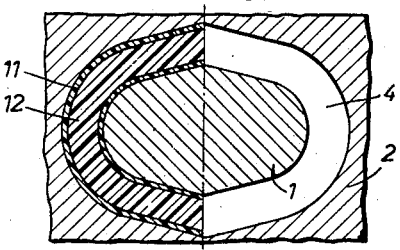
Fig. 6 shows a plan section of a further embodiment where a casing is provided around the filled in material.

The work-pieces 1, as shown in the Figures 6 and 7, are mounted in a required number on a workpiece 3. The work-pieces 2 have an aperture 4 like in the foregoing examples. The assemblage is carried out so far, that the pieces 1 and 2 are located in their final right position relatives to each other. A circumferentially closed, tubular packing foil 11 is pushed over the work-piece 1, until it is in the right position relative to the work-piece 2. The packing foil 11 is then filled with a material 12 to such an extent, that the tubular casing forms a close fit both in the workpiece 2 and around the workpiece 1. To assist the filling of the material 12 into the foil 11, and to permit if necessary a deaeration promoting the complete filling, valves 18 are for instance connected to the foil. The use of a valve has the advantage, that the filling material can be subjected to pressure in order to fill all cross-sections entirely. After the solidification of the material the valve head 18 must be removed as it will presently only disturb. Depending on the required packing, the filling material is selected in such a manner, that it will either solidify upon filling or retain a certain elasticity. Further the material for the tubular casing must also be chosen to suit the requirements. A packing is thus obtained, which adapts itself readily both to the shape of the workpiece 1 and to that of the workpiece 2.

Example 4

Figure 8:
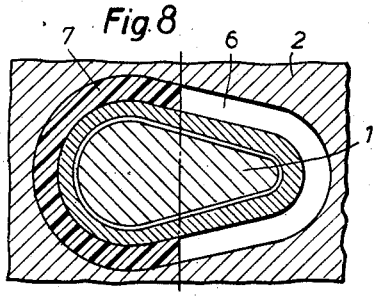
Figs. 8 and 9 show a plan and vertical section respectively of an embodiment, where fitting members are provided on the whole length of penetration.
Figure 9:
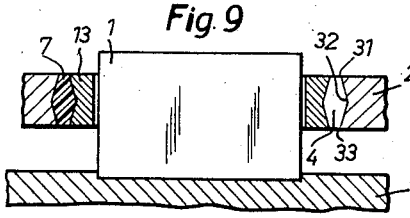

The work-pieces 1 according to the Figures 8 and 9 are mounted on a work-piece 3. The workpiece 2 has apertures 4, which follow in plan section, the profile of the workpiece 1 as shown in Figure 8, while they have in vertical section for instance the profile 31—32—33, as shown in Figure 9. The assemblage is carried out so far, that the workpieces 1 and 2 are located in their final right position relative to each other. Subsequently the accurately fitting members 13 are pushed over the workpieces 1. The said members have a suitable tolerance with respect to the work-pieces 1. As the workpieces 1 and the fitting members 13 can both be finished by machining before they are assembled, they can easily be manufactured in series on suitable machines. The fitting members are temporarily held in place on the level, where they are to be fitted in (usually on the level of the work piece 2). The space 6, which is thus formed between the work pieces 2 and the fitting members 13 is then filled with a material 7. When a strong bond has been formed by the solidification of the material 7, the members 13 are accurately and firmly fixed to the workpiece 2 in the right position relative to the workpiece 1. Thereby inaccurate dimensions of the openings 4 in the workpiece 2 as well as inaccuracies which possibly occurred during the mounting of the workpieces 1 on the workpiece 3 are necessarily accounted for and do not disturb the relative displacement of the parts.

Example 5

Figure 10:
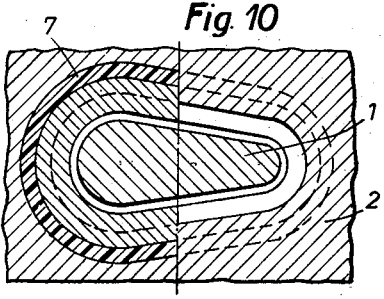
Figs. 10 and 11 show a plan and vertical section respectively of an embodiment, where two thin fitting members are provided.
Figure 11:
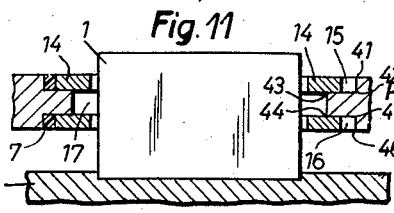

The workpieces 1 according to the Figures 10 and 11 are mounted in a required number on a workpiece 3. The workpiece 2 has apertures 4. The periphery of those apertures follows in plan section the profile of the workpiece 2 as shown in the Figure 10 whereas they have in vertical section the profile 41—42—43—44—45—46, as shown in the Figure 11. The assemblage is carried out so far, that the workpieces 1 and 2 assume their final relative position. On each side of the workpiece 2 a thin fitting member 14 fully enclosing the workpiece 1 is fitted into the recesses 15. The depth 45—46 of those recesses corresponds to the thickness of the thin members 14, whereas their periphery is larger than that of said members. Thus a space 16 is formed between the workpiece 2 and the fitting piece 14. The space 16 is filled with a material 7, which adheres strongly both to the workpiece 2 and the fitting member 14. The space 17 can be left empty or can be filled, depending on the requirements. The advantage of this method resides in the fact, that like in the example 4 the fitting members 14 and the workpieces 1 can be finished by machining before they are assembled irrespective of their later position. No extra work is needed, as an inaccurate setting of the workpieces 1 on the support 3 only influences the distribution of the space 16 around the fitting members. The recesses 15 must therefore be large enough to make allowance for any possibly occurring displacement.

I claim:

In a process of manufacturing interpenetrating bodies which are movable in the direction of the axis of penetration, the steps of finishing fitting surfaces of a penetrating body, finishing a penetration aperture of the corresponding penetrated body, locating said penetrating body in the required position in said aperture, a space being left between said fitting surfaces of the penetrating body and the walls of said aperture, covering said fitting surfaces with a removable coating, enclosing a portion of said fitting surfaces with an elastic packing, pressing said elastic packing against the underlying portion of said coating, introducing an elastic filling material into said space and between said walls of the aperture, said packing and the portion of the coating located outside of said packing, and then removing said coating, whereby said filling material fills a portion of the space left by said coating to provide a seal between upper and lower sides of the bodies.

References Cited in the file of this patent

UNITED STATES PATENTS

| 224,541 | Jackman | Feb. 17, 1880 |
| 873,976 | Zimmerman | Dec. 17, 1907 |
| 1,343,017 | Ware | June 8, 1920 |
| 1,863,209 | Shank | June 14, 1932 |
| 1,907,015 | Swart | May 2, 1933 |
| 1,982,932 | Scribner | Dec. 4, 1934 |
| 2,444,904 | Worley | July 6, 1948 |
| 2,608,529 | Varian | Aug. 26, 1952 |
| 2,690,004 | Crawford | Sept. 28, 1954 |